US008917881B2

(12) United States Patent
Jenq

(10) Patent No.: US 8,917,881 B2
(45) Date of Patent: Dec. 23, 2014

(54) ENCLOSURE-LESS LOUDSPEAKER SYSTEM

(76) Inventor: Cheng Yih Jenq, Piscataway, NJ (US)

( * ) Notice: Subject to any disclaimer, the term of this patent is extended or adjusted under 35 U.S.C. 154(b) by 458 days.

(21) Appl. No.: 13/023,792

(22) Filed: Feb. 9, 2011

(65) Prior Publication Data

US 2011/0182449 A1 Jul. 28, 2011

Related U.S. Application Data

(63) Continuation-in-part of application No. 12/657,686, filed on Jan. 26, 2010, now Pat. No. 8,249,268.

(51) Int. Cl.

| | |
|---|---|
| ***H04B 3/00*** | (2006.01) |
| ***H04R 1/20*** | (2006.01) |
| ***H04R 25/00*** | (2006.01) |
| ***H04R 1/40*** | (2006.01) |
| ***H04R 1/26*** | (2006.01) |
| *H04R 1/34* | (2006.01) |

(52) U.S. Cl.

CPC .................. *H04R 1/403* (2013.01); *H04R 1/26* (2013.01); *H04R 1/345* (2013.01); *H04R 2217/03* (2013.01); *H04R 2499/13* (2013.01)

USPC .............................. 381/77; 381/339; 381/160

(58) Field of Classification Search

USPC ........... 381/77, 337, 339, 160, 162, 182, 186, 381/99, 423; 181/144, 147, 155, 156, 199

See application file for complete search history.

(56) References Cited

U.S. PATENT DOCUMENTS

| | | | | |
|---|---|---|---|---|
| 3,125,181 | A * | 3/1964 | Pawlowski | 381/89 |
| 4,057,689 | A | 11/1977 | Stallings, Jr. | |
| 4,554,414 | A | 11/1985 | House | |
| 4,890,689 | A * | 1/1990 | Smith | 181/144 |
| 5,590,214 | A | 12/1996 | Nakamura | |
| 5,742,696 | A | 4/1998 | Walton | |
| 5,781,645 | A * | 7/1998 | Beale | 381/370 |
| 5,894,524 | A | 4/1999 | Kotsatos et al. | |
| 6,108,433 | A | 8/2000 | Norris | |
| 7,016,508 | B1 * | 3/2006 | Phelps | 381/77 |
| 7,224,808 | B2 | 5/2007 | Spencer et al. | |
| 7,743,879 | B2 * | 6/2010 | Inagaki et al. | 381/423 |
| 2004/0240697 | A1 | 12/2004 | Keele, Jr. | |
| 2005/0281413 | A1 | 12/2005 | Croft, III | |
| 2006/0204016 | A1 | 9/2006 | Pham et al. | |
| 2007/0165878 | A1 | 7/2007 | Konagai | |

* cited by examiner

*Primary Examiner* — Ping Lee

(74) *Attorney, Agent, or Firm* — Gerald E. Hespos; Michael J. Porco; Matthew T. Hespos

(57) ABSTRACT

A loudspeaker system is provided for uniformly emanating sound waves to a listening area. The loudspeaker system includes a plurality of drivers, where each driver includes a front face, a rear face, and an axis of symmetry extending substantially perpendicularly through both the front and rear face. Each driver is configured to emanate low and high frequency sound waves from its front face substantially along its axis of symmetry. The loudspeaker system also includes a support structure having an inner volume. The support structure is configured to support the drivers in an arrangement such that the front face of each driver is directed toward the inner volume and the axis of symmetry of each driver intersects a relatively small volume near a central point located at the center of the inner volume. A listening area for the loudspeaker system is outside of the inner volume of the support structure.

16 Claims, 13 Drawing Sheets

ENCLOSURE-LESS LOUDSPEAKER SYSTEM

CROSS-REFERENCE TO RELATED APPLICATIONS

This application is a continuation-in-part of U.S. patent application Ser. No. 12/657,686, filed Jan. 26, 2010, the entire disclosure of which is incorporated by reference herein.

BACKGROUND

1. Field

The present disclosure relates generally to audio and speaker systems, and more particularly, to an enclosure-less loudspeaker system including a plurality of tweeter drivers and a method of tweeter driver placement.

2. Description of the Related Art

A tweeter driver converts an electrical signal to mechanical movement of a diaphragm in a back and forth motion along a line of axis of the driver. The sound wave exerted by the diaphragm travels in a peculiar way: the low frequency sound wave disperse spherically while the high frequency propagates along the line of axis of the tweeter driver, and the higher the frequency, the more narrow the propagation path. The result is that when a sound wave reaches a listener who is sitting in the line of axis of one speaker driver, e.g., a tweeter, he or she will hear only the high frequency part of the sound, since most of the low frequency component of the sound wave are well dispersed into space and become too thin to be heard.

SUMMARY

A woofer-less and enclosure-less loudspeaker system including a plurality of tweeter drivers and a method of tweeter driver placement are provided. The speaker system of the present disclosure uses multiple tweeter drivers to create a space of sound wave where high frequencies are evenly spaced, by angularly equal distance placement of the drivers, while low the frequencies are reinforced by each other tweeter drivers' output.

According to one aspect of the present disclosure, a speaker system for providing uniform sound in a listening area is provided, including a plurality of drivers, each driver including a front face and a rear face with an axis of symmetry extending from both the front face and the rear face, each driver configured for propagating sound energy along the axis of each driver from the front face, wherein the sound energy includes low frequency and high frequency components; and a support structure for arranging the plurality of drivers in such a way that the axis extending from the rear face of each of the drivers converge in a single point in space, wherein as the sound is propagated along the axis of each driver from the front face, the high frequency components from each driver are evenly spaced and the low frequency components from each driver are reinforced by the low frequency components of adjacent drivers.

In one aspect, the driver is a tweeter.

In another aspect, each of the plurality of drivers are equidistant from the converge point. In other aspects, at least one first driver is positioned at a different distance than at least one second driver.

In a further aspect, the support structure is configured in a spherical shape. In other aspects, the support structure is configured in a planar shape, cylindrical shape, cubical shape or spiral shape.

In yet another aspect, a speaker system for providing uniform sound in a listening area includes a plurality of tweeter drivers, each tweeter driver including a front face and a rear face with an axis of symmetry extending from both the front face and the rear face, each tweeter driver configured for propagating sound energy along the axis of each tweeter driver from the front face, wherein the sound energy includes low frequency and high frequency components; a support structure for arranging the plurality of tweeter drivers in such a way that the axis extending from the rear face of each of the tweeter drivers converge in a single point in space, each of the plurality of drivers being equidistant from the converge point; and at least one reflector positioned adjacent to at least one tweeter driver along the axis of propagation from the front face, wherein as the sound is propagated along the axis of the at least one tweeter driver having at least one reflector, the high frequency components are reflected back toward the front face creating an acoustic shadow behind the at least one reflector and the low frequency components are diffracted to fill the acoustic shadow area behind other reflectors. In this embodiment, the support structure may be configures as an open-ended hemisphere, an arc, a planar surface, etc.

According to another embodiment, the speaker system further includes a carrier wave generator for generating a carrier wave of ultrasound frequency, wherein an input electrical sound signal is superimposed on the carrier wave before being input to the plurality of drivers.

In yet another embodiment, a loudspeaker system is provided including a plurality of drivers, each driver including a front face, a rear face, and an axis of symmetry extending substantially perpendicularly through both the front face and the rear face, each driver configured to emanate low frequency and high frequency sound waves from its front face substantially along its axis of symmetry; and a support structure having an inner volume, the support structure configured to support the drivers in an arrangement such that the front face of each of the drivers is directed toward the inner volume and the axis of symmetry extending from the front face of each of the drivers intersects a relatively small volume at or near a central point located at the center of the inner volume; wherein a listening area is outside of the inner volume of the support structure.

In another aspect, an enclosure-less loudspeaker system for uniformly emanating sound waves to a listening area is provided. The enclosure-less loudspeaker system including a plurality of tweeter drivers, each tweeter driver including a front face, a rear face, and an axis of symmetry extending substantially perpendicularly through both the front face and the rear face, each tweeter driver configured to emanate high frequency sound waves from its front face substantially along its axis of symmetry; a first spherical support structure having an inner volume, the first spherical support structure configured to support the tweeter drivers in an arrangement such that the front face of each of the tweeter drivers is directed toward the inner volume and the axis of symmetry extending from the front face of each of the tweeter drivers intersects a relatively small volume at or near a central point located at the center of the inner volume, the first spherical support structure further configured to support the tweeter drivers at substantially equal distances from the central point; a plurality of woofer drivers, each woofer driver including a front face, a rear face, and an axis of symmetry extending substantially perpendicularly through both the front face and the rear face, each woofer driver configured to emanate low frequency sound waves from its front face substantially along its axis of symmetry; and a second spherical support structure being disposed concentrically about the first spherical support structure, the second spherical support structure configured to support the woofer drivers in an arrangement such that the front face of each of the woofer drivers is directed toward the inner volume and the axis of symmetry extending from the front face of each of the woofer drivers intersects the relatively small volume at or near the central point located at the center of the inner volume, the second spherical support structure further configured to support the woofer drivers at substantially equal distances from the central point; wherein a listening area is outside of the inner volume of the first spherical support structure.

BRIEF DESCRIPTION OF THE DRAWING

The above and other aspects, features, and advantages of the present disclosure will become more apparent in light of the following detailed description when taken in conjunction with the accompanying drawings.

FIG. 4 is a partial cross sectional view of another embodiment of a speaker system which illustrates partial shielding in accordance with the present disclosure;

Figure 1:
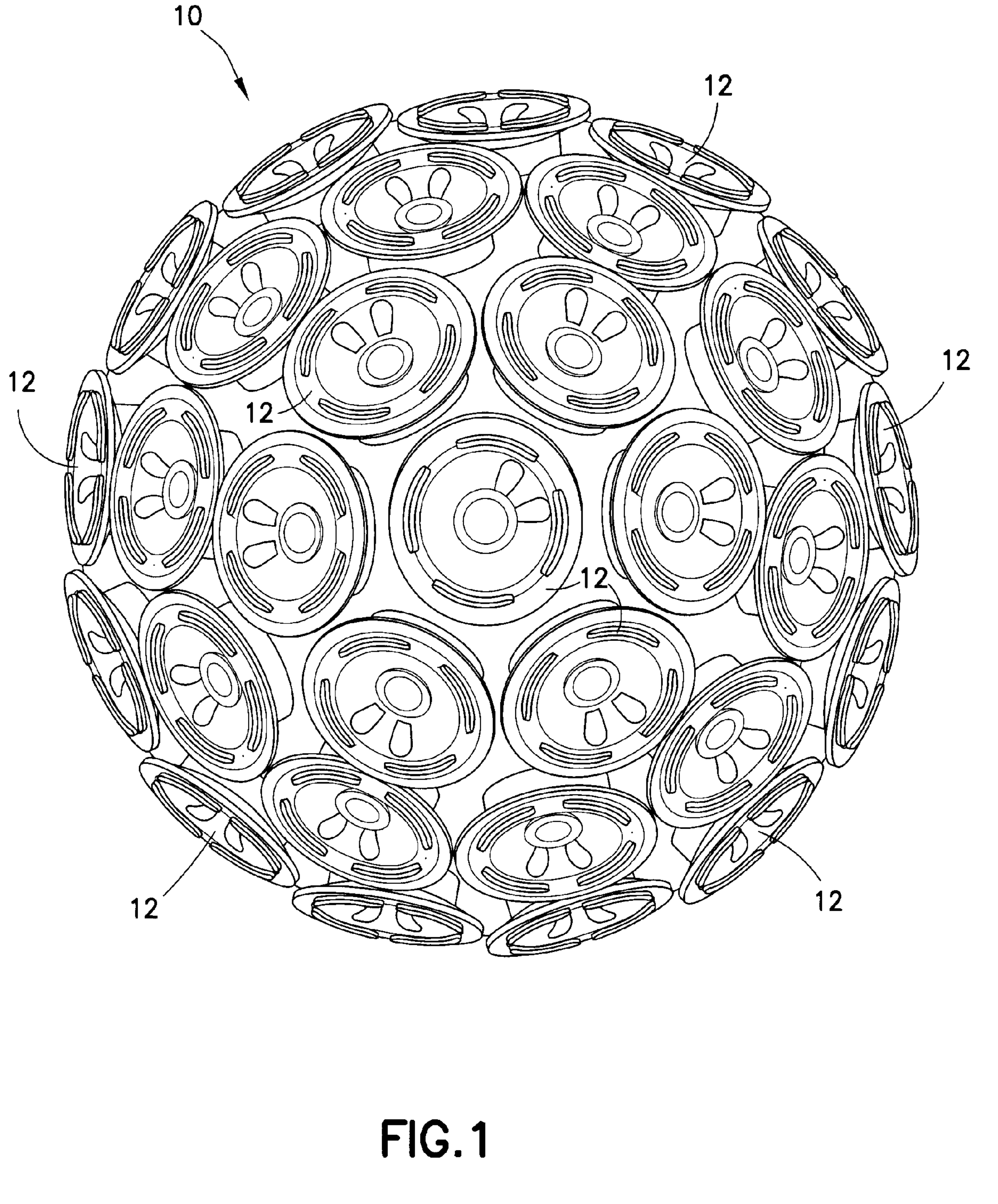
FIG. 1 is a three-dimensional (3D) view of a speaker system in accordance with the present disclosure.

To facilitate understanding, identical reference numerals have been used, where possible, to designate identical elements that are common to the figures, except that alphanumerical suffixes may be added, when appropriate, to differentiate such elements. The images in the drawings are simplified for illustrative purposes and are not depicted to scale.

The appended drawings illustrate exemplary embodiments of the present disclosure and, as such, should not be considered as limiting the scope of the disclosure that may admit to other equally effective embodiments. Correspondingly, it has been contemplated that features or steps of one embodiment may beneficially be incorporated in other embodiments without further recitation.

DETAILED DESCRIPTION

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A woofer-less and box-less loudspeaker system including a plurality of tweeter drivers and a method of tweeter driver placement are provided. This invention uses multiple tweeter drivers to create a space of sound wave where high frequencies are evenly spaced, by angularly equal distance placement of the drivers, while the low frequencies are reinforced by each other tweeter drivers' output. The placement of the drivers can be almost anywhere except their angles are very important, that is, the placement is concentric and evenly dispersed in angle. The configuration of the drivers are three dimensional, and therefore, the resultant shape and form could be cubical, planar, spherical, cylindrical, etc.

Referring to FIG. 1, a three-dimensional (3D) view of a speaker system 10 in accordance with the present disclosure is illustrated. The speaker system 10 includes a plurality of drivers 12. The drivers 12 employed in the present disclosure are tweeters used in conventional loudspeakers. Exemplary tweeters or tweeter drivers are disclosed in U.S. Pat. No. 5,742,696 to Walton entitled "Modular Tweeter" and U.S. Pat. No. 5,894,524 to Kotsatos et al. entitled "High Power Tweeter", the contents of both of which are hereby incorporated by reference. Conventional tweeters usually are capable of producing output in the frequency range of 2,000 to 20,000 Hz and higher. The drivers employed in the present disclosure are all equal in physical properties.

Figure 2C:
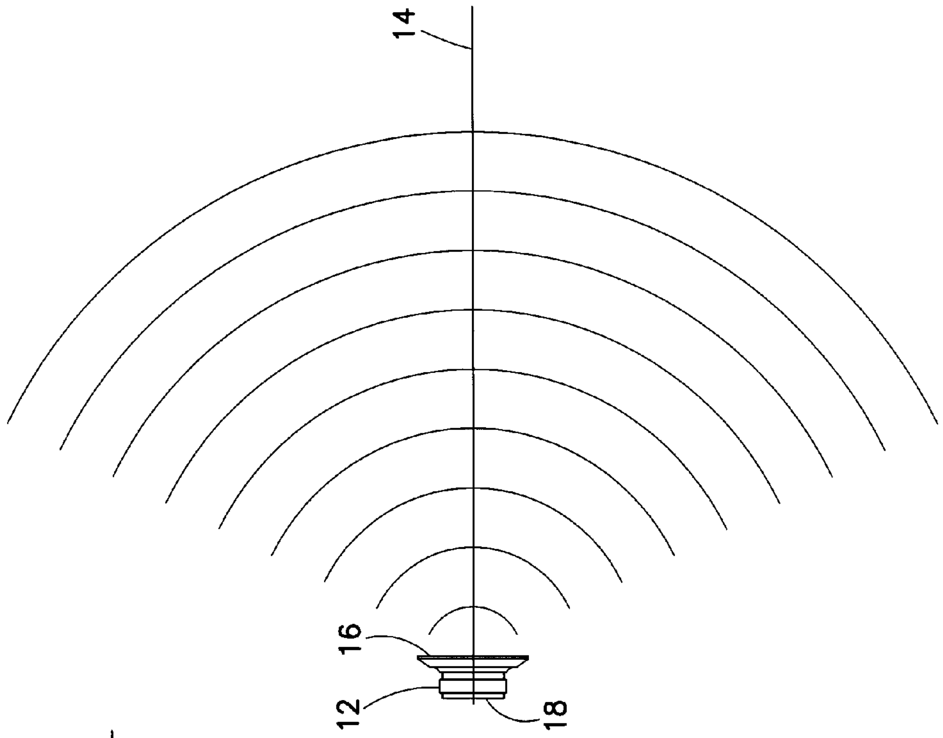
FIG. 2B illustrates a high frequency propagation pattern of a sound wave and FIG. 2C illustrates a low frequency propagation pattern of a sound wave along the line of axis of a driver.
Figure 2A:
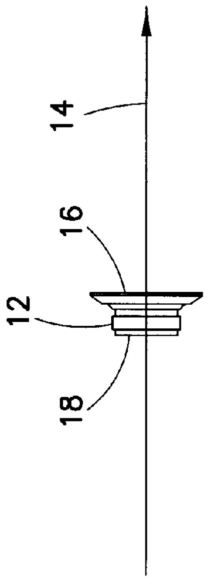
FIG. 2A illustrates a line of axis of a driver.
Figure 2B:
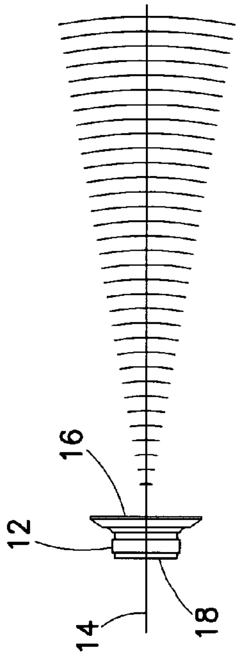

Referring to FIG. 2A, for each driver 12, there is an imaginary line of axis 14 which is the line of geometrical symmetry. Each driver 12 include a front face or surface 16 and a rear or back surface 18. This imaginary line of axis 14 extends in both direction from the rear surface 18 through the front surface 16 of the driver 12. Since the driver's diaphragm, in the case of a dome tweeter, has its motion along this line of axis 14, this line of axis also represent the direction of the propagation of the sound wave, which generally propagates from the front face 16 of the driver along this axis 14. FIG. 2B illustrates a high frequency propagation pattern and FIG. 2C illustrates a low frequency propagation pattern for driver 12 along the line of axis 14.

Figure 3A:
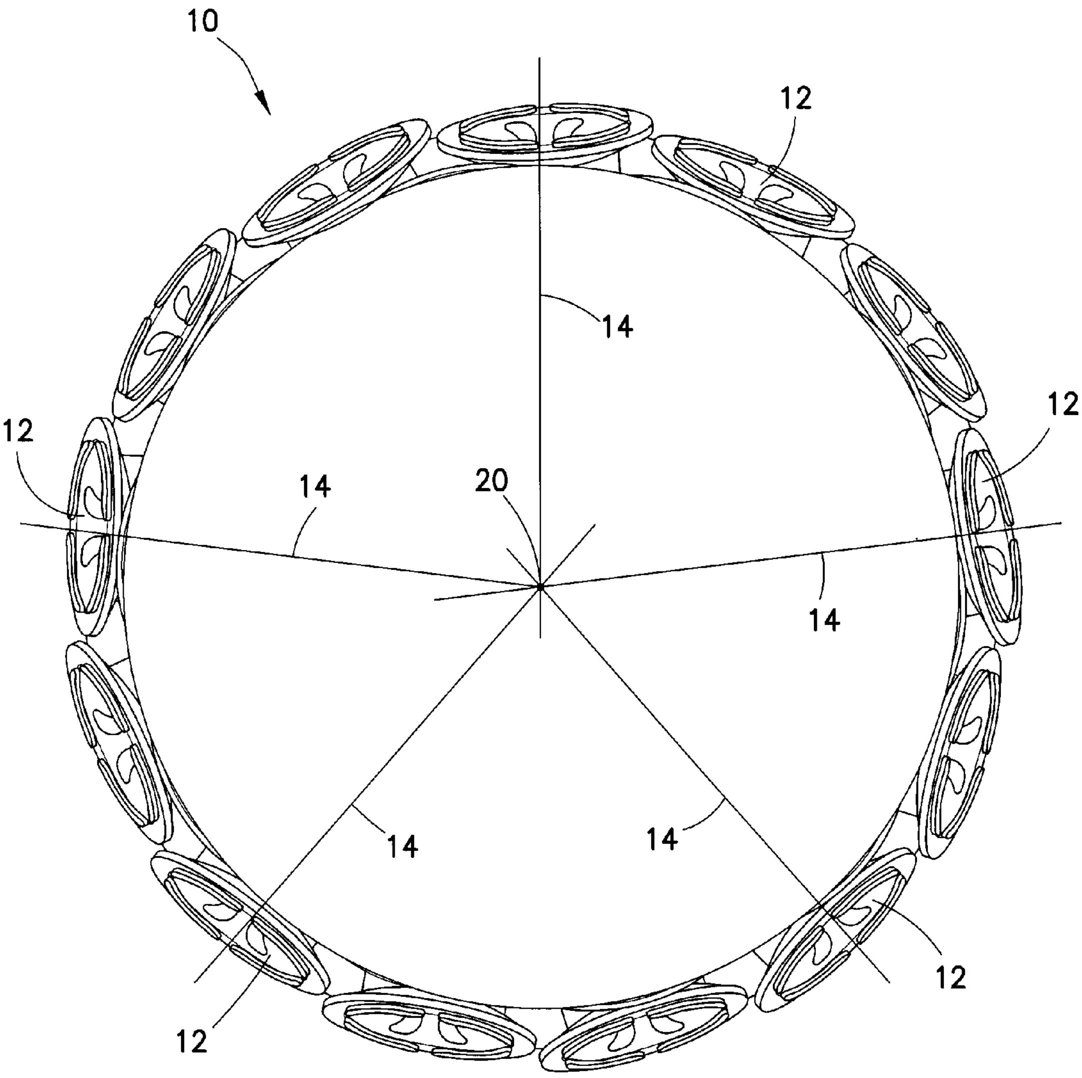
FIG. 3A is a cross sectional view of the speaker system shown in FIG. 1 in accordance with an embodiment of the present disclosure.

A plurality of drivers 12 are clustered and placed in space that, preferably, the lines of axis of all drivers backward converge at one point in space behind a rear surface of each of the drivers, and that, the lines of axis are spread out evenly with equal angular distance from each other, so that in the vicinity of the clustered drivers the sounds produced are as evenly dispersed as possible. For example, FIG. 3A illustrates a cross sectional view of the speaker system shown in FIG. 1. As shown in FIG. 3A, the drivers 12 are arranged such that the lines of axis 14 of each driver 12 backward converge at a single point in space 20. In this embodiment, the drivers are equidistant from the point of convergence 20. Arrangement as such will make sure there is no crossing over of the lines of propagation of sound waves and that there is no concentration point in the listening area. By providing such an arrangement, the drivers provide low frequency reinforcement that can reach a listener whether the drivers are aim at the listener or not.

Figure 3B:
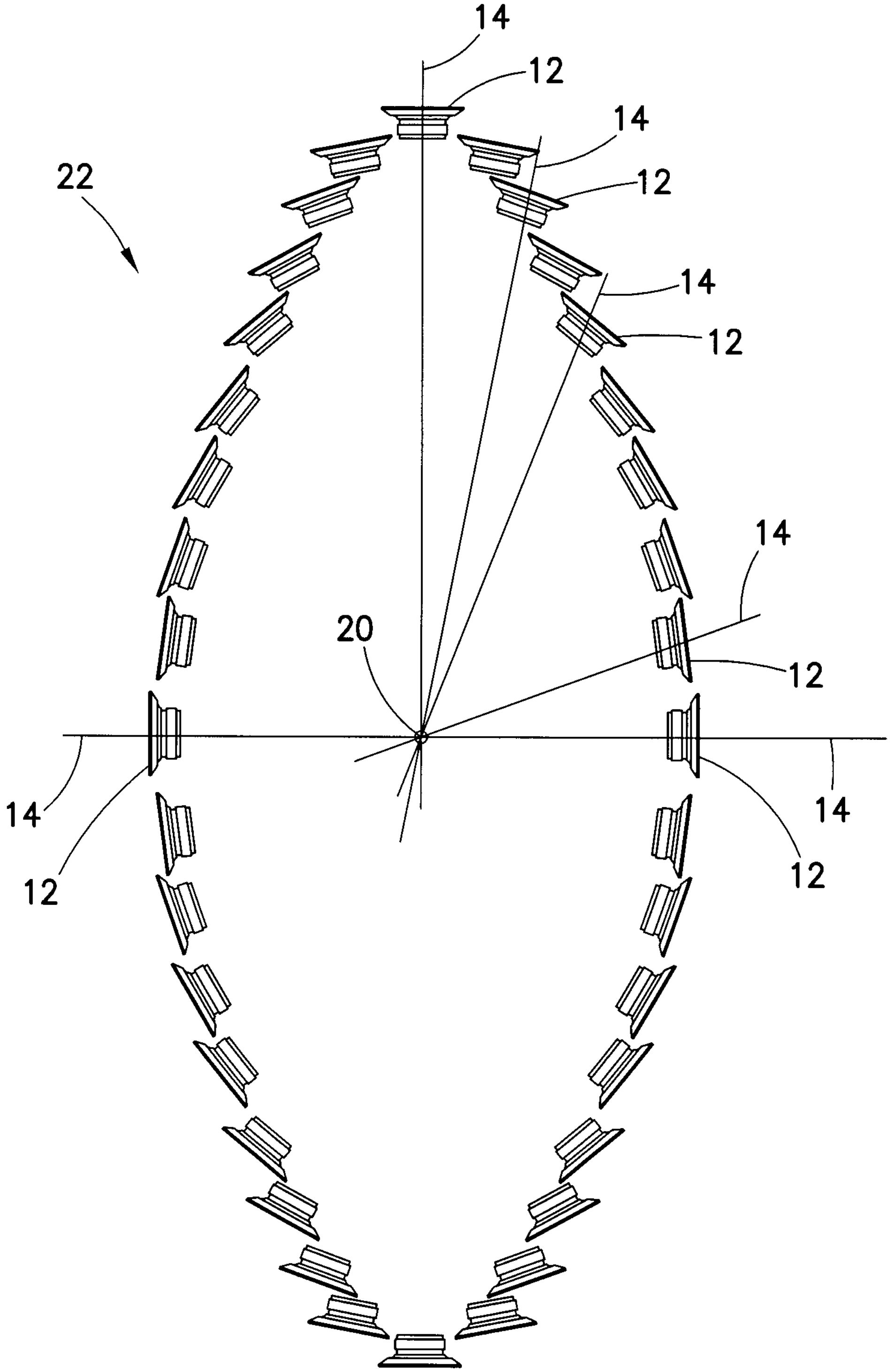
FIG. 3B is a cross sectional view of a speaker system in accordance with another embodiment of the present disclosure.

Although all drivers, preferably, share one common point of origination and convergence of the lines of axis, the distance of the drivers to this point does not have to be the same, i.e., various drivers may be placed at different distances from the point of convergence. As a result, the drivers placement are flexible to form planar, cylindrical, cubical, spiral or spherical shapes. For example, FIG. 3B illustrates a configuration 22 where the drivers 12 are arranged in an oval or convex shape. In this embodiment, each driver is arranged at a different angle relative to the other drivers while ensuring the backward converge of each drivers' line of axis 14 converge at a single point 20.

The louder speaker system constructed as above consists of no mid-range driver and of no woofer driver. Furthermore, the louder speaker system constructed as above consists of no box and/or enclosure, which are commonly employed in a conventional speaker. Conventional speaker drivers are mounted on a closed box and such an arrangement is in effect a "drum", which imparts its characteristic resonance to the sound material. Although the drivers 12 are assembled on some type of support structure, the structure is minimal to support the drivers but will not alter or effect the sound quality of the speaker system. In one embodiment, the support structure is configured from a wire frame. The wire frame will support the drivers without any coloration to the sound produced by the speaker system. It is to be appreciated that other support structures configured from various known materials may be employed to arrange the drivers in accordance with the teachings of the present disclosure. For example, the support structure may be configured as a tree-like structure, a honey comb structure with a hollow core, etc. In the speaker system in accordance with the principles of the present disclosure, the sound coloration as a result of the resonance of the box or enclosure is therefore completely eliminated.

By employing the principles of the present disclosure, several advantages can be achieved.

1. The speaker system in this invention can be configured as a ball shape, a column, a pyramid, a thin panel, an oval, and so on.

2. The speaker system is free of placement restriction. For example, as shown in FIG. 1, the speaker system is configured as a three dimensional spherical object emitting sound waves in all directions in space, equally in all directions, and is therefore called omni-directional. There is restriction to the relative position of a listener to the speaker system, and vice versa.

3. The speaker system will sound the same regardless of the listener's relative position, whether sitting, standing, or moving about.

4. The speaker system is free of the woofer's and the box's coloration of the sound.

5. The speaker system is compact and has a small footprint, making it ideal for a narrow space such as in a car. In a further example, the speaker system shown in FIG. 1 can be mounted on a pedestal, where the footprint of the system is the base of the pedestal which can be relatively small.

Figure 4:
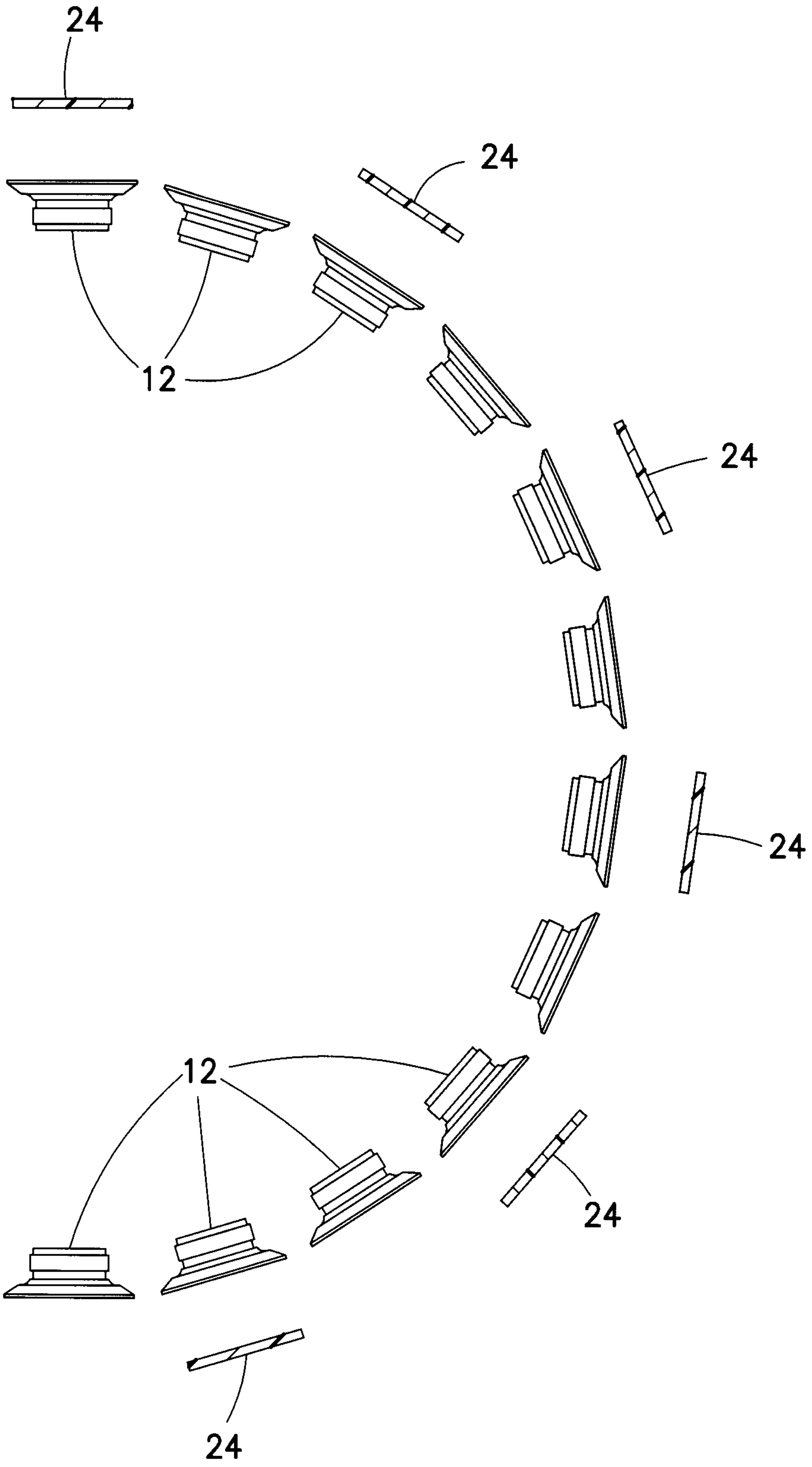
FIG. 4 is a partial cross sectional view of the speaker system shown in FIG. 1 which illustrates partial shielding in accordance with the present disclosure.
Figure 5:
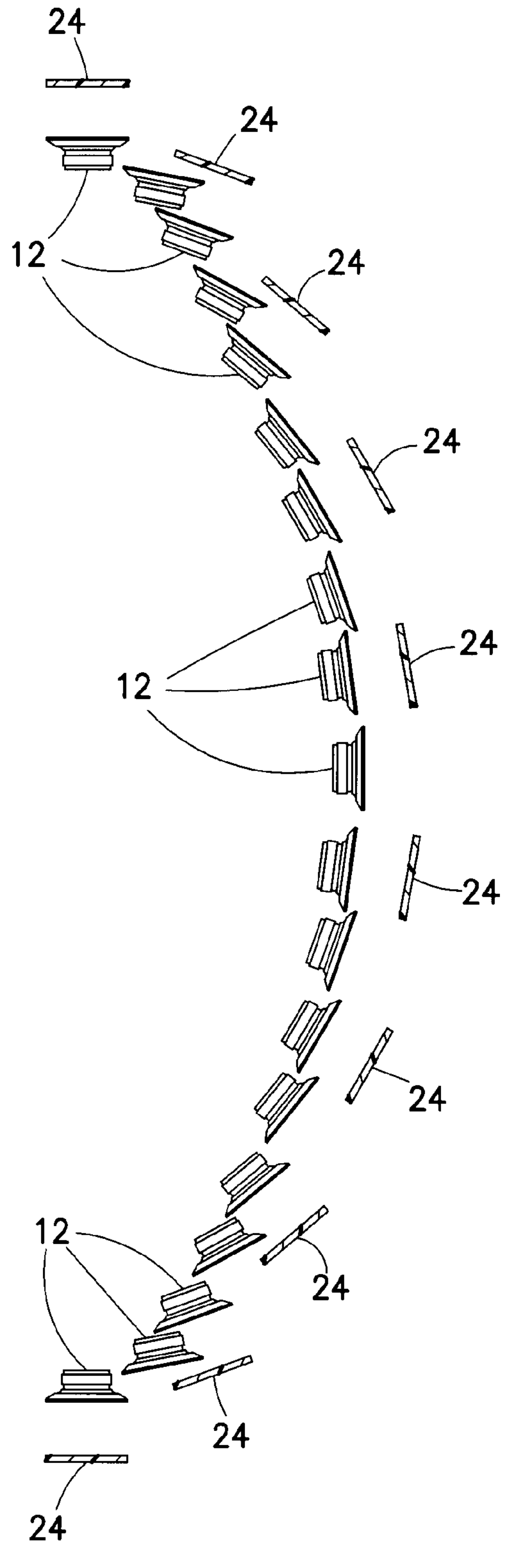
FIG. 5 is a partial cross sectional view of another embodiment of a speaker system which illustrates partial shielding in accordance with the present disclosure.
Figure 6A:
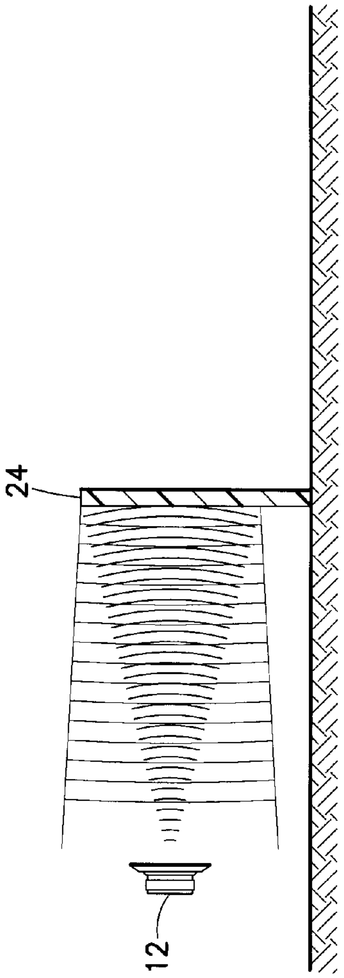
FIG. 6A illustrates a high frequency sound wave being reflected by a sound shield barrier or reflector and FIG. 6B illustrates a low frequency sound wave being diffracted by a barrier or reflector.
Figure 6B:
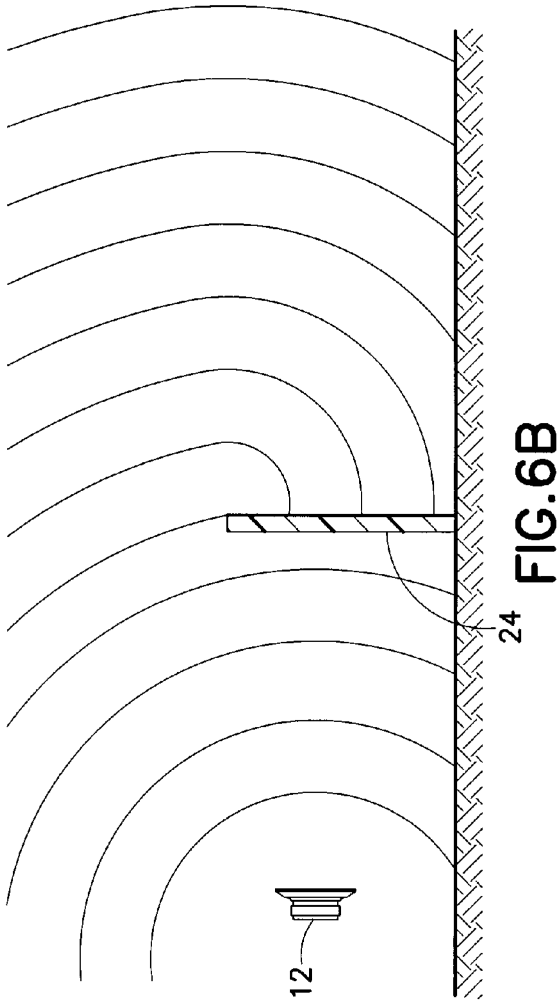

Although ideally the speaker system is a three dimensional cluster of tweeters, in some embodiments, the rear half of the cluster may be removed, leaving only the frontal half of the cluster, as illustrated in FIGS. 4 and 5, where FIG. 4 is a hemisphere configuration and FIG. 5 includes a single line of drivers configured on an oval shaped arc. The result is the sound quality, especially the low frequency portion or bass of the sound, is compromised, since some of the bass sound contributed from the rear half of the cluster is no longer available. In the listening area where the frontal half of the cluster is facing, the high frequency portion of the sound would be relatively too intense due to the reduced intensity of the low frequency. To correct this, partial shielding is used in which reflectors 24 are placed in front of some of the tweeters 12 to reduce the intensity of the high frequency portion of the sound, since it will be reflected backward. The low frequency will not be affected since it will diffract or diffuse around these reflectors. This principle is explained in FIG. 6 where FIG. 6A illustrates how a high frequency sound wave can be reflected by a sound shield barrier or reflector 24 which results in an acoustic quiet shadow area, while the low frequency sound wave can be diffracted by the same barrier or reflector 24 and fill the same shadow area as illustrated in FIG. 6B. Preferably, the reflectors 24 are made from a material that is inert to sound frequency such as plaster, styrene foam, cement, or any other material that does not resonant to any sound frequency.

Figure 7:
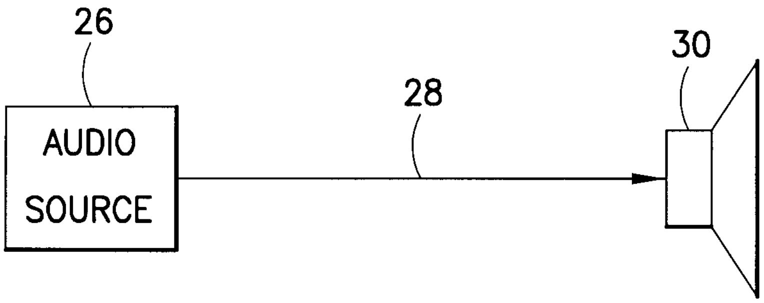
FIG.7 PRIOR ART
FIG. 7 is a schematic diagram of a conventional audio speaker system.
Figure 8:
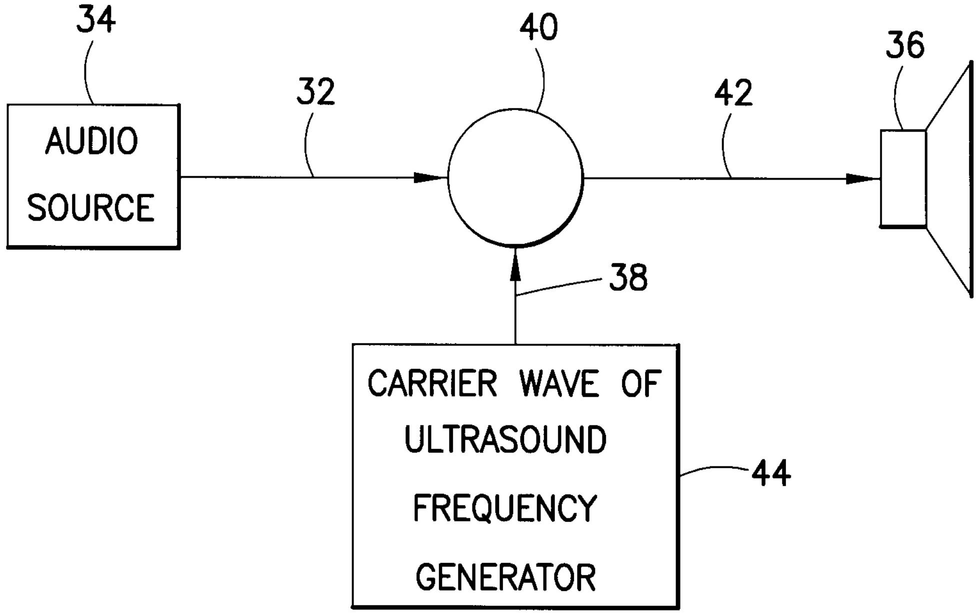
FIG. 8 is a schematic diagram of a audio speaker system in accordance with the present disclosure.

In one embodiment, the use of a carrier frequency in the ultrasound range to modulate an electrical signal of sound source for direct input to the above said speaker system is employed. In a conventional speaker system as shown in FIG. 7, an electrical signal 28 representing sound source material 26 enters the input terminal of the speaker system 30 so that the electrical signal 28 impels the diaphragm of the speaker to reproduce the sound source material. In the speaker system of the present disclosure, the electrical signal 32 from the audio source 34, before entering the speaker 36, is amplitude modulated with a carrier wave 38 of ultrasound frequency, the carrier wave being generated by generator 44, as shown in FIG. 8. The electrical sound signal 32 may be superimposed on the carrier wave 38 by a mixer 40 or any other known suitable means. The resultant signal 42 is then fed to the input terminal of the speaker 36.

The sound reproduced as described above, upon reaching a listener, is filtered off the ultrasound carrier frequency by the listener's ear, since human's ear is insensitive to the ultrasound frequency, leaving only the reproduced source sound. The carrier wave can be of a frequency above 20 kHz, which is beyond human ear's perception, or of the same frequency as the sampling frequency of digital sound material such as a Compact Disc (CD), e.g., the sampling frequency for the CD format is 44.1 kHz.

Since no conventional speaker driver can accept a DC signal and output a DC sound pressure, the ultrasound carrier embodiment of the present disclosure can "disguise" a DC signal into a high frequency signal and that can be handled by the speaker driver. The human ear will filter off the ultrasound and leaving only the DC sound signal to be heard. Such benefit applies to DC signals and extremely low frequencies.

Figure 9:
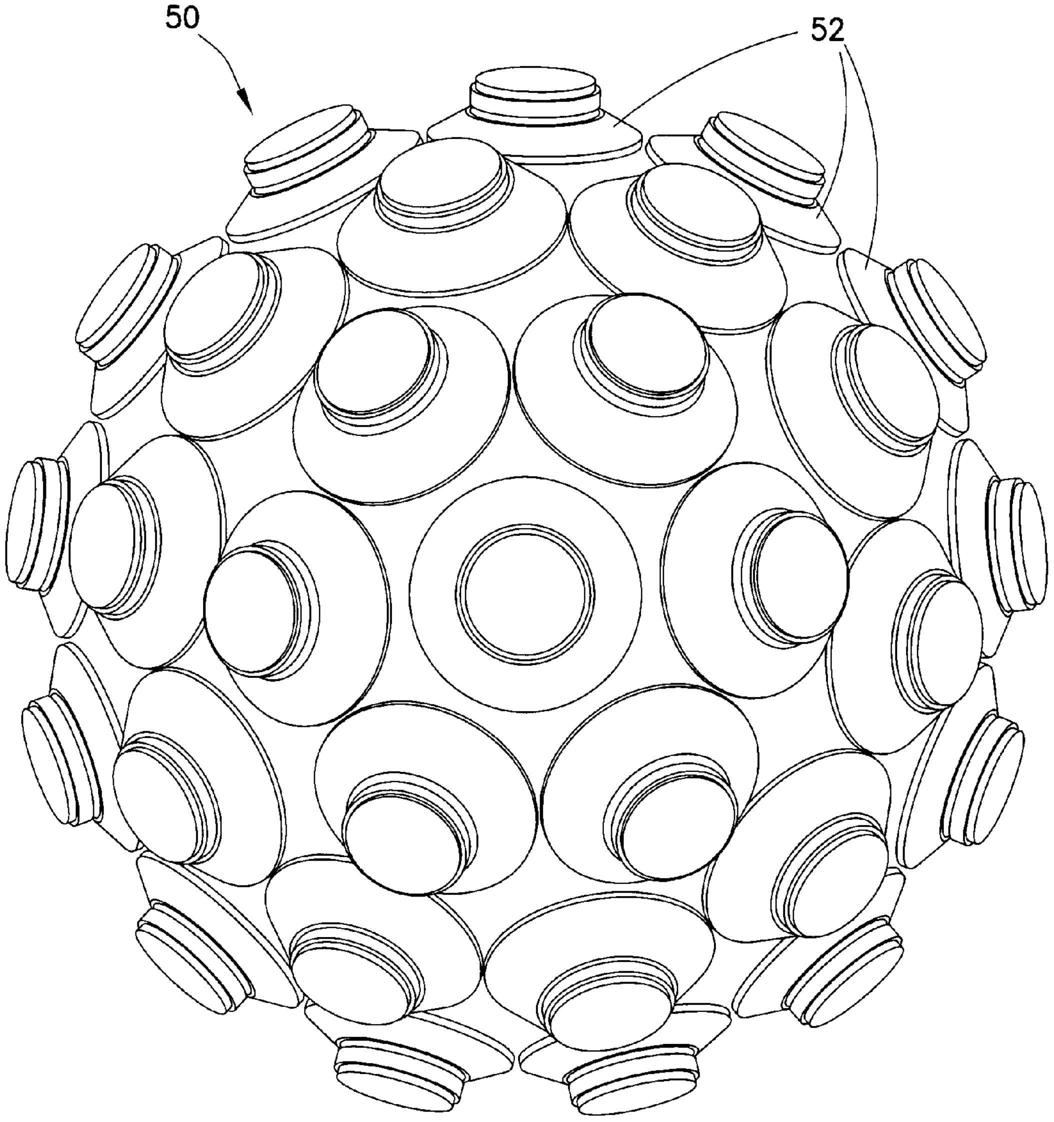
FIG. 9 is a 3D view of another embodiment of a speaker system in accordance with the present disclosure.

Referring to FIG. 9, a 3D view of another embodiment of a speaker system 50 in accordance with the present disclosure is illustrated. The speaker system 50 includes a plurality of drivers 52. The drivers 52 may be tweeters used in conventional loudspeaker systems and may be configured to produce an output in the frequency range from about 2 kHz to about 20 kHz or higher. The drivers 52 employed in the speaker system 50 of the present disclosure may be equal or substantially equal in physical and/or electromechanical properties.

Similar to the drivers 12 shown in FIGS. 1-6, each driver 52 in speaker system 50 has an axis line, which represents the driver's axis of geometrical symmetry. Each driver 52 includes a front face and a rear face. The axis of symmetry of each driver 52 extends substantially perpendicularly through both the front face and rear face. The front face of each driver 52 includes a diaphragm that vibrates in directions along the axis of symmetry to produce sound waves. This axis of symmetry also represents the general direction of propagation of the sound waves, which propagate from the diaphragm at the front face of the driver 52.

Various support structures may be configured to support multiple drivers 52. For example, the drivers 52 may be arranged in space relative to one another such that the axes of symmetry extending from the front face of the drivers 52 intersect at one point in space at the center of an inner volume of the support structure. In some embodiments, the axes of symmetry may pass through a relatively small volume at or near the center of the inner volume. The drivers 52 may be spread out evenly around the inner volume toward which the front faces of the drivers 52 are directed. When the drivers 52 are distributed evenly, the angles between their axes of symmetry may be substantially equal. In this arrangement, the sound waves emanating from the drivers 52 are originally directed inwardly toward the center of the support structure.

Figure 10A:
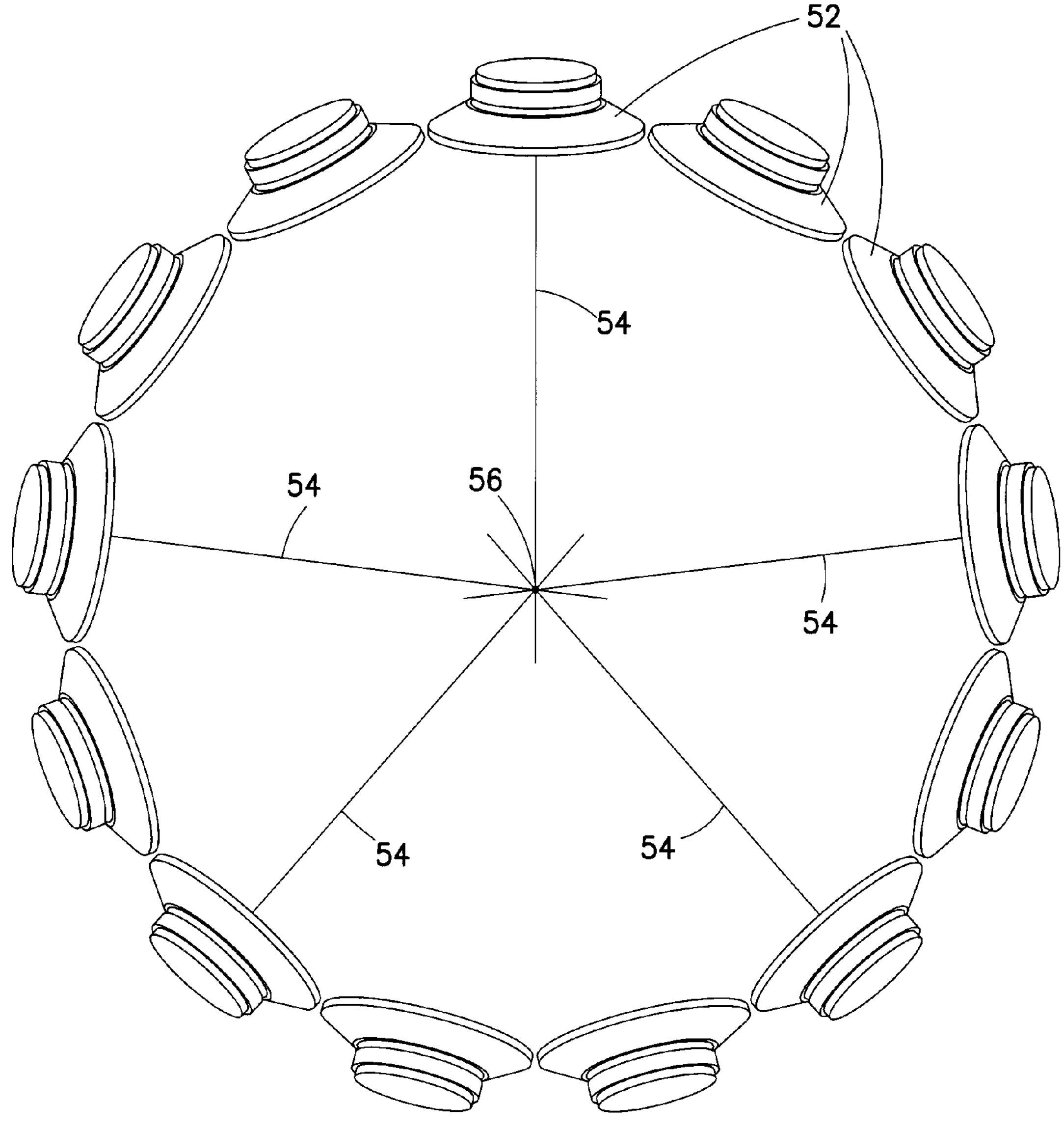
FIG. 10A is a cross sectional view of the speaker system shown in FIG. 9 in accordance with an embodiment of the present disclosure.

FIG. 10A illustrates a cross sectional view of the speaker system 50 shown in FIG. 9. As shown in FIG. 10A, the drivers 52 are arranged such that the axes of symmetry 54 of each driver 52 converge at a single point in space 56. In some embodiments, the drivers 52 may be arranged at substantially equal distances from the single point 56. With such an arrangement, the general lines of propagation of the sound waves emanating from the drivers 52 are focused on the common point 56. From the common point 56, the sound waves continue to propagate through gaps formed between the drivers 52. In this way, the sound wave is evenly distributed to area outside the inner volume of the support structure and there are no concentration points in the listening area. By providing such an arrangement, the drivers provide low frequency reinforcement that can reach a listener whether the drivers are aim at the listener or not.

According to some embodiments, the general shape of the drivers 52 from a front view may be circular or oval. It should be recognized that arranging circular or oval drivers 52 in three dimensions around an inner volume will result in gaps between the drivers 52, regardless of how closely they are positioned. Many of the sound waves directed toward the inner volume are thus able to emanate through the gaps to the space outside the arrangement of drivers 52. Therefore, the listening area is intended to be outside the loudspeaker system and the audio signals will seem to emanate from a single point source, which is at or near the center point 56.

Figure 10B:
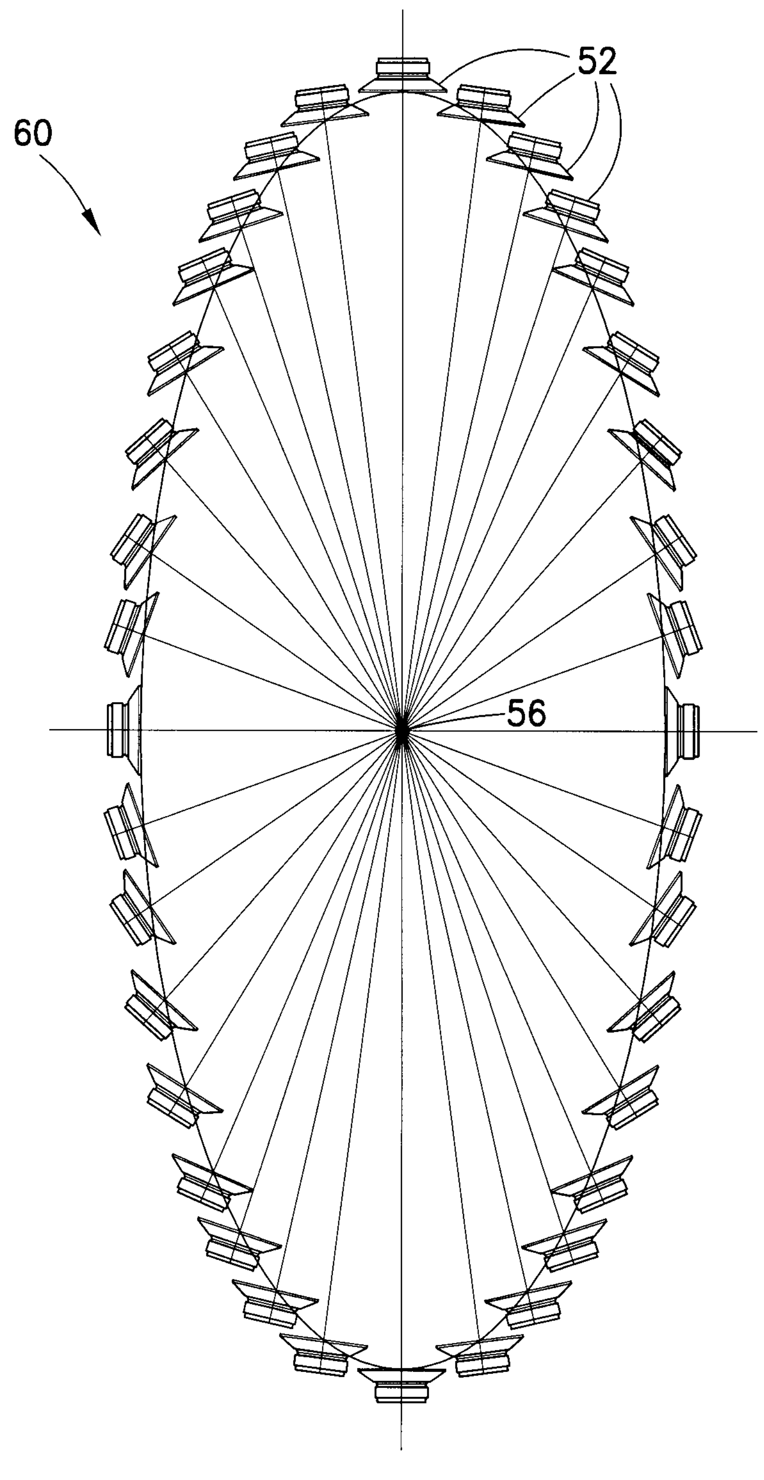
FIG. 10B is a cross sectional view of a speaker system in accordance with another embodiment of the present disclosure.

Although the drivers 52 share one common point of origination and convergence of the axes of symmetry according to the embodiment of FIG. 10A, the distance of the drivers 52 to the point 56 does not have to be the same. That is, various drivers 52 may be placed at different distances from the point of convergence 56. As a result, the driver placement may be flexible in some embodiments so as to form planar, cylindrical, cubical, spiral or spherical shapes, among others. For example, FIG. 10B illustrates a configuration 60 where the drivers 52 are arranged in an oval or convex shape. In this embodiment, each driver 52 is arranged at a different angle relative to the other drivers while ensuring the intersection of each driver's axis of symmetry 54 with the common point 56. In some embodiments, the axes of symmetry 54 may intersect with a relatively small volume, elongated volume, or line segment at or near the point 56 at the center of the arrangement of drivers 52 and support structure.

The speaker systems 50 and 60 of FIGS. 9 and 10 may be constructed to contain only tweeters and no mid-range drivers or woofer drivers. Furthermore, the speaker systems 50 and 60 may be constructed without boxes and/or enclosures, which are commonly employed in conventional speaker systems. Conventional speaker drivers are normally mounted on the surfaces of a closed box with the diaphragms facing outward to project the sound waves in a generally linear fashion, as mentioned above. The conventional speaker box therefore imparts its characteristic resonance to the sound waves to significantly alter the sound quality. According to the various implementations of the present disclosure, the drivers 52 are fixedly mounted on a support structure that has little, if any, effect on the sound quality of the speaker systems 50 and 60. The support structure may include minimal materials for supporting the drivers 52 to reduce or even completely eliminate the sound coloration as a result of the resonance of a box or enclosure.

In one embodiment, the support structure may be configured as a wire frame. The wire frame will support the drivers without any effect or coloration to the sound produced by the speaker system. It is to be appreciated that other support structures configured from various known materials may be employed to arrange the drivers in accordance with the teachings of the present disclosure. For example, the support structure may be configured as a tree-like structure, a honey comb structure with a hollow core, etc. The embodiments of FIGS. 9 and 10 may also include at least some of the same advantages mentioned with respect to FIGS. 1-6.

Although the speaker systems 50 and 60 are three dimensional clusters of tweeters, in some embodiments, the rear half of the clusters may be removed, leaving only the frontal half of the clusters, similar to FIGS. 4 and 5. To correct any imbalance in the frequency response of the half clusters, partial shielding, such as reflectors, may be placed behind some of the drivers 52 or in front of some of the gaps. Shielding may help to reduce the intensity of high frequency portions of the sound while having little or no effect on low frequency portions since the lower frequencies are able to diffract around these reflectors as explained with respect to FIG. 6.

According to various embodiments with respect to the inwardly directed arrangement of drivers as shown in FIGS. 9 and 10, the use of a carrier frequency in the ultrasound range may be employed in a manner that is similar to the description with respect to FIG. 8. For example, an audio signal may be amplitude modulated with a carrier wave in the ultrasound frequency range. The mixed audio signal and carrier wave are applied to each driver 52 of the speaker systems 50 and 60.

Figure 11A:
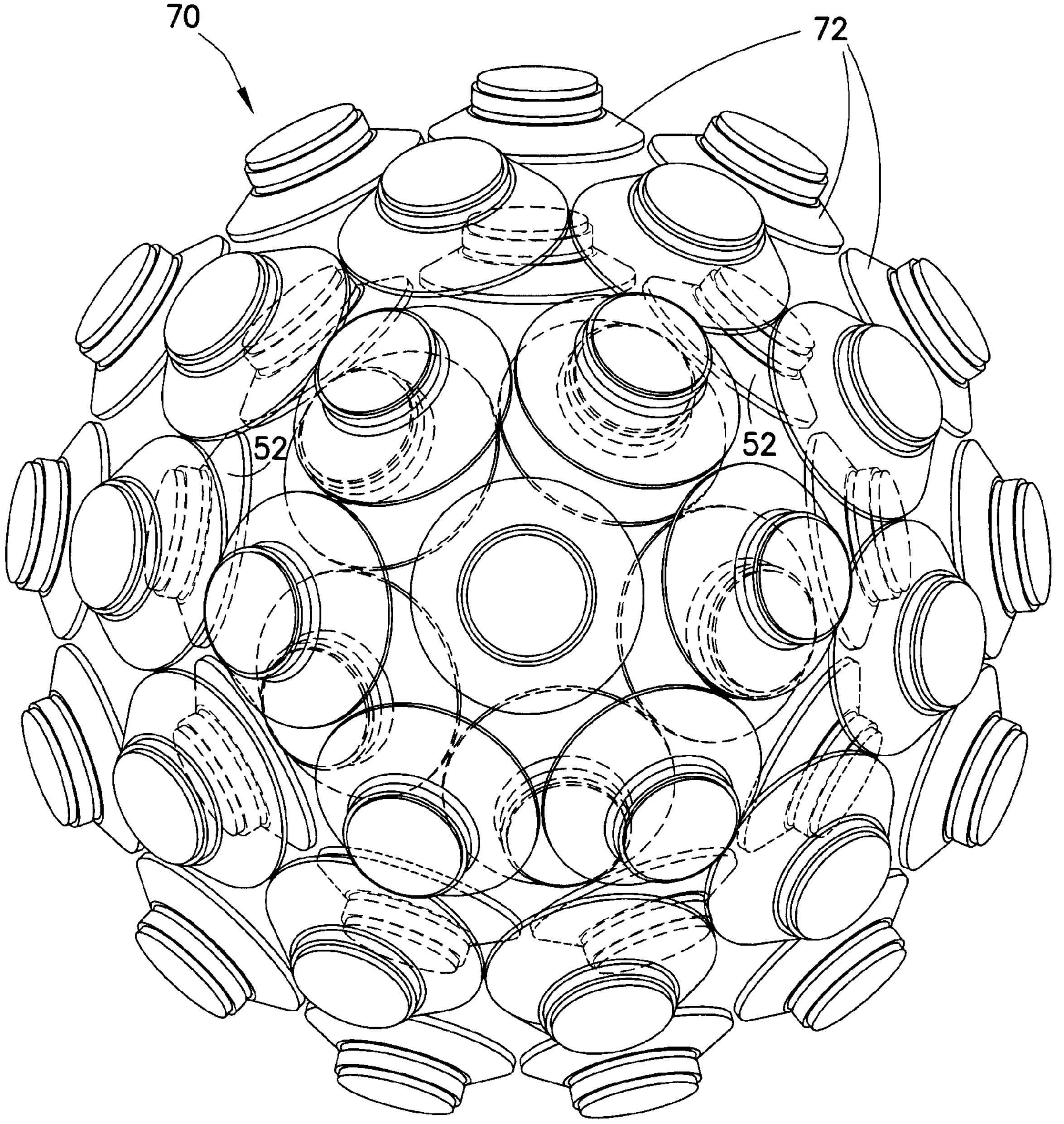
FIG. 11A is a 3D view of another embodiment of a speaker system in accordance with the present disclosure.

In another embodiment, in order to extend the bass performance of the loudspeaker system, the loudspeaker system will employ woofer drivers, where a sphere of woofer drivers is disposed concentrically about the sphere of tweeter drivers. Referring to FIG. 11A, a 3D view of this embodiment of in accordance with the present disclosure is illustrated as speaker system 70. In this embodiment, a tweeter driver cluster is arranged in an inward facing and spherical configuration, complemented by a woofer driver cluster also arranged in an inward facing and spherical configuration which is disposed about the tweeter cluster. It is to be appreciated that the woofer drivers employed are conventional woofer drivers known in the art to produce low frequency sounds, typically from around 40 hertz up to about a kilohertz or higher. Each spherical cluster may be powered separately and speaker system 70 may perform as a two-way speaker system.

Figure 11B:
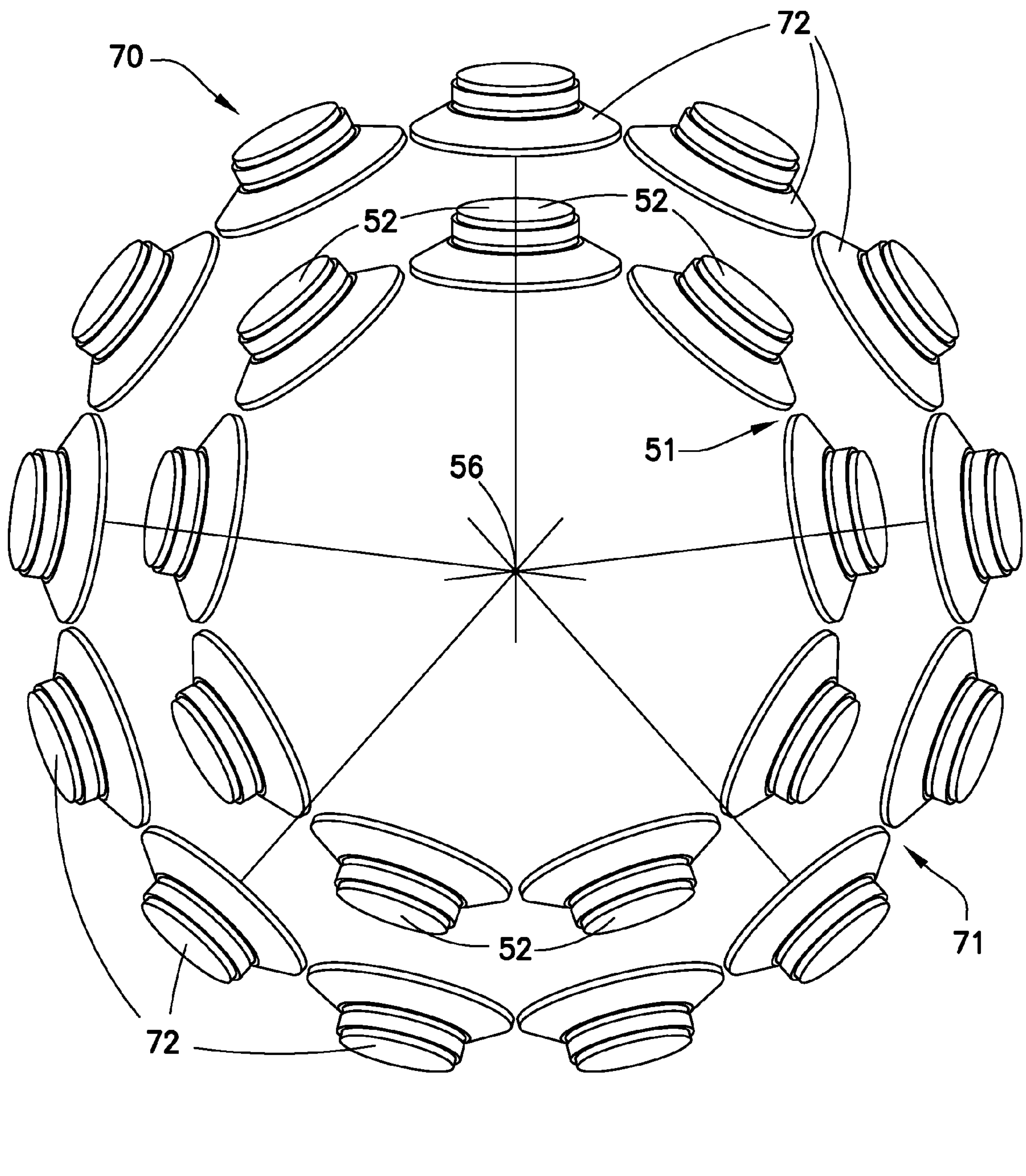
FIG. 11B is a cross sectional view of the speaker system shown in FIG. 11A illustrating an inner sphere of tweeter drivers surrounded by an outer sphere of woofer drivers in accordance with an embodiment of the present disclosure.

In FIG. 11A, the tweeter sphere includes a plurality of tweeter drivers 52 and is shown in broken lines within an outer sphere consisting of a plurality of woofers 72 surrounding the inner tweeter sphere. As shown in FIG. 11B, the inner tweeter sphere 51 and the outer woofer sphere 71 are concentric and share a common focal point 56 is space. It is to be appreciated that the woofer drivers 72 may be arranged in various configurations relative to the tweeter drivers 52. For example, in one embodiment, the woofer drivers 72 may be arranged directly behind a tweeter driver 52 to deflect emanating sound waves. In another embodiment, each woofer driver 72 may be arranged so the axis of symmetry will pass through a gap in the arrangement of tweeter drivers to the central point 56.

It is to be appreciated that any of the features described above in relation to other embodiments such as those features shown and described in relation to FIGS. 1-10B would apply to the speaker system 70 shown in FIGS. 11A-B.

Although the disclosure herein has been described with reference to particular illustrative embodiments, it is to be understood that these embodiments are merely illustrative of the principles and applications of the present disclosure. Therefore numerous modifications may be made to the illustrative embodiments and other arrangements may be devised without departing from the spirit and scope of the present disclosure, which is defined by the appended claims.

What is claimed is:

1. A loudspeaker system comprising:

a plurality of drivers, each driver including a front face, a rear face, and an axis of symmetry extending substantially perpendicularly through both the front face and the rear face, each driver configured to emanate low frequency and high frequency sound waves from its front face substantially along its axis of symmetry; and a three dimensional support structure configured to support the drivers in a substantially spherical shape having an inner volume, the three dimensional support structure configured to support the drivers in an arrangement around the inner volume such that the front face of each of the drivers is directed toward the inner volume and the axis of symmetry extending from the front face of each of the drivers intersects a relatively small volume at or near a central point located at the center of the inner volume;

wherein a listening area is outside of the inner volume of the three dimensional support structure; and wherein as the sound waves are emanated from the front face of each driver, the high frequency sound waves from the drivers are evenly spaced and the low frequency sound waves from the drivers are reinforced by the low frequency sound waves of adjacent drivers.

2. The loudspeaker system of claim 1, wherein each of the plurality of drivers is a tweeter.

3. The loudspeaker system of claim 1, wherein the drivers are equidistant from the central point.

4. The loudspeaker system of claim 3, further comprising at least one reflector positioned adjacent to at least one gap formed between adjacent drivers.

5. The loudspeaker system of claim 4, wherein the at least one reflector comprises an inert material.

6. The loudspeaker system of claim 1, wherein the three dimensional support structure comprises a wire frame.

7. The loudspeaker system as in claim 1, further comprising a carrier wave generator for generating a carrier wave within the ultrasound frequency range, wherein an input audio signal is superimposed on the carrier wave before being input to the plurality of drivers.

8. The loudspeaker system as in claim 7, wherein the input audio signal is a DC signal.

9. The loudspeaker system as in claim 1, wherein the three dimensional support structure has little if any effect on the quality of the sound waves.

10. The loudspeaker system as in claim 1, wherein the three dimensional support structure is further configured to support the drivers such that the edges of the drivers abut one another and such that a plurality of gaps are formed between the drivers.

11. The loudspeaker system as in claim 10, wherein the sound waves are configured to emanate from the inner volume through the gaps to the listening area outside the inner volume.

12. The loudspeaker system as in claim 1, wherein the sound waves are configured to emanate uniformly throughout the listening area.

13. A loudspeaker system for uniformly emanating sound waves to a listening area, the loudspeaker system comprising:

a plurality of tweeter drivers, each tweeter driver including a front face, a rear face, and an axis of symmetry extending substantially perpendicularly through both the front face and the rear face, each tweeter driver configured to emanate low frequency and high frequency sound waves from its front face substantially along its axis of symmetry; and a three dimensional spherical support structure configured to support the drivers in a substantially spherical shape having an inner volume, the three dimensional spherical support structure configured to support the tweeter drivers in an arrangement around the inner volume such that the front face of each of the tweeter drivers is directed toward the inner volume and the axis of symmetry extending from the front face of each of the tweeter drivers intersects a relatively small volume at or near a central point located at the center of the inner volume, the three dimensional spherical support structure further configured to support the tweeter drivers at substantially equal distances from the central point;

wherein a listening area is outside of the inner volume of the three dimensional spherical support structure; and wherein the tree dimensional support structure is further configured to support the drivers such that multiple gaps are formed between the drivers to allow the sound waves to emanate from the inner volume through the gaps to the listening area outside the inner volume.

14. The loudspeaker system as in claim 13, further comprising a carrier wave generator for generating a carrier wave having a frequency in the ultrasound range, wherein an input electrical sound signal is superimposed on the carrier wave before being input to the plurality of tweeter drivers.

15. The loudspeaker system as in claim 13, wherein the three dimensional spherical support structure has little if any effect on the quality of the sound waves.

16. A loudspeaker system for uniformly emanating sound waves to a listening area, the loudspeaker system comprising:

a plurality of tweeter drivers, each tweeter driver including a front face, a rear face, and an axis of symmetry extending substantially perpendicularly through both the front face and the rear face, each tweeter driver configured to emanate high frequency sound waves from its front face substantially along its axis of symmetry;

a first spherical support structure having an inner volume, the first spherical support structure configured to support the tweeter drivers in an arrangement such that the front face of each of the tweeter drivers is directed toward the inner volume and the axis of symmetry extending from the front face of each of the tweeter drivers intersects a relatively small volume at or near a central point located at the center of the inner volume, the first spherical support structure further configured to support the tweeter drivers at substantially equal distances from the central point;

a plurality of woofer drivers, each woofer driver including a front face, a rear face, and an axis of symmetry extending substantially perpendicularly through both the front face and the rear face, each woofer driver configured to emanate low frequency sound waves from its front face substantially along its axis of symmetry; and a second spherical support structure being disposed concentrically about the first spherical support structure, the second spherical support structure configured to support the woofer drivers in an arrangement such that the front face of each of the woofer drivers is directed toward the inner volume and the axis of symmetry extending from the front face of each of the woofer drivers intersects the relatively small volume at or near the central point located at the center of the inner volume, the second spherical support structure further configured to support the woofer drivers at substantially equal distances from the central point;

wherein a listening area is outside of the inner volume of the first spherical support structure.

* * * * *